L. MILLER.
MOTION PICTURE FILM.
APPLICATION FILED SEPT. 17, 1914.
1,193,175.
Patented Aug. 1, 1916.
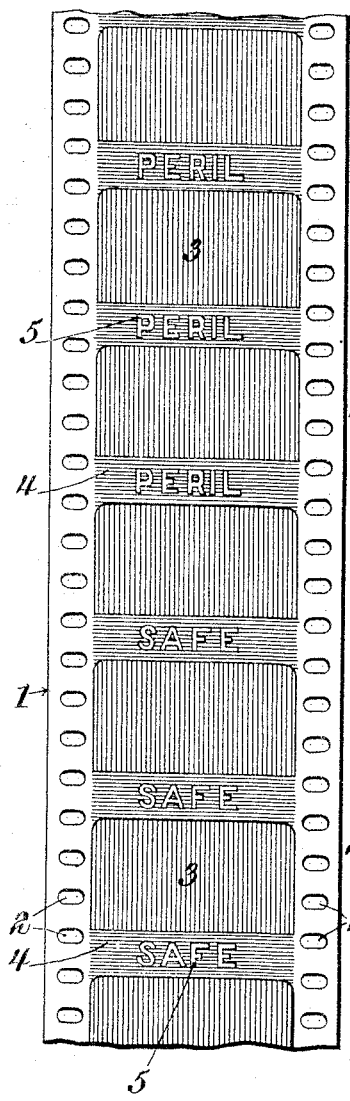
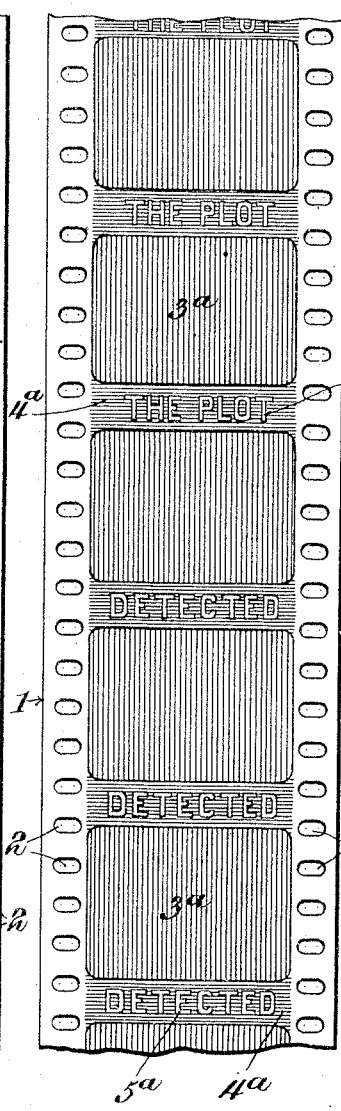
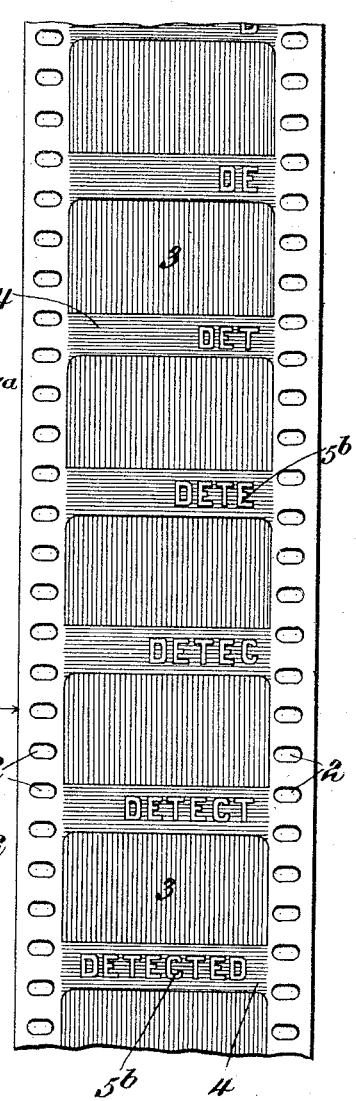
WITNESSES
Howard D. Orr.
F. T. Chapman.
Lee Miller, INVENTOR,
BY E. G. Siggers.
ATTORNEY

UNITED STATES PATENT OFFICE.

LEE MILLER, OF CHICAGO, ILLINOIS.

MOTION-PICTURE FILM.

1,193,175.　　　Specification of Letters Patent.　　Patented Aug. 1, 1916.

Original application filed March 31, 1914, Serial No. 828,595. Divided and this application filed September 17, 1914. Serial No. 862,214.

*To all whom it may concern:*

Be it known that I, LEE MILLER, a citizen of the United States, residing at Chicago, in the county of Cook and State of Illinois, have invented a new and useful Motion-Picture Film, of which the following is a specification.

This invention has reference to motion picture films, and its object is to provide a film with descriptive words or phrases accompanying the individual pictures, the wording changing with the change of scene or other condition represented by the pictures.

Ordinarily in motion picture exhibitions wording descriptive of the scenes is thrown upon the screen prior to the showing of a group of pictures having no descriptive matter accompanying them, and these pictures continue until the next important subject is to be described.

With the present invention the description progresses simultaneously with the scenes or other pictures and the beholder does not have to depend upon memory as to the meaning of what is being observed upon the screen.

In the present invention the motion pictures may be taken in the usual way, except that each picture is separated from its neighbor by a narrow space which may be of a width equivalent to the spacing of the usual perforations along the edges of the film. In such case the height of the pictures is either correspondingly reduced or pictures of full height are spaced apart by distances equal to the usual distances between the perforations. In the latter case it is necessary to provide a slight change in the driving mechanism of the photographing and projecting instruments, while in the first case no change whatever in the driving mechanism of these instruments is required. In both cases the title appears upon the screen below the bottom of the picture, and in order to avoid distracting glares it is preferred to have the title appear in white or tints upon a black background.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a somewhat exaggerated view of a fragment of a positive film embodying the present invention. Fig. 2 is a similar view of a modified form of the film. Fig. 3 is a view showing still another modification of the invention.

Referring to the drawings, there are indicated in the several figures short strips 1 of film of the character employed in connection with motion picture machines, the films being provided with the usual marginal perforations 2 spaced as is customary.

In Fig. 1 the pictures are assumed to be in spaces 3 of the usual length crosswise of the film, but of less height than is customary. As motion pictures are commonly made their height lengthwise of the film is that represented by the space occupied by four perforations, but in the arrangement of Fig. 1 the height of each picture lengthwise of the film is approximately that represented by three perforations, and the neighboring pictures are separated by a space 4 corresponding approximately to the distance between two perforations, so that the height of each picture plus the height of an intervening space between two pictures is equal to the customary height of a picture as ordinarily produced on a motion picture film.

Within the space between two adjacent pictures in the structure of Fig. 1 there is produced a legend 5 descriptive of the subject of the picture, and where a series of pictures relate to a common subject the legend is repeated throughout the series, so as to be constantly presented upon the screen to the eye of the observer.

It is advantageous to have the legend 5 appear white upon a black background, or light upon a dark background, so that there may be no intense glare distracting to the eye of the observer immediately adjacent to the picture being produced upon the screen. Of course, a suitable tint may be employed within the space 4, in which case the legend may appear in black or contrasting color in such space.

Under some circumstances the legend may consist of a single word if sufficiently descriptive, or if needful it may consist of a phrase or even a whole sentence, and usually the space provided will be found large enough to permit the display of a considerable number of words with the letters of a size to be readily readable by an audience in an auditorium of the customary extent.

In Fig. 2 there are spaces 3ª corresponding in height and width to the usual size of picture employed in motion picture films, it being understood that the showing of Fig. 2 is exaggerated. Between the spaces 3ª are spaces 4ª carrying a legend 5ª and these spaces and legends correspond to the spaces 4 and legends 5 of the arrangement shown in Fig. 1. Since in Fig. 2 each picture space 3ª is of full size and the picture spaces are separated by the height of the space 4ª, a film of a certain length will have a less number of pictures thereon than with the arrangement shown in Fig. 1, but the pictures will in themselves be larger. In the structure of Fig. 2 a picture and an adjoining space are together equal to the length occupied by about five perforations 2 instead of four, as in the structure of Fig. 1. Since the spacing of the perforations 2 remains the same as is customary, the feeding gear of the photographing and projecting machines must be correspondingly changed to cause the film to be fed five spaces instead of four between each exposure.

In Fig. 3 the film 1 has picture spaces 3 as in Fig. 1 and also has dividing spaces 4 as in Fig. 1, but there is a legend 5ᵈ so produced that it will appear to move across the film progressively in a direction opposed to the reading movement of the eye, that is, the legend will appear to move across the screen from right to left. Thus the descriptive matter forms a running commentary on the pictures readily readable by the observer, because slowly moving across the screen, so that a relatively large amount of descriptive matter may be displayed despite the fact that the available space between the pictures is limited and would prevent more than a small fraction of such descriptive matter being shown if the arrangement of the legend indicated in Figs. 1 and 2 were followed.

The legend may be produced by making the spaces 4 or 4ª during the exposure of the film for the production of the negative and then afterward exposing the spaces 4 or 4ª to photograph the legend while the first exposed or picture part of the film is masked and all parts of the film may be developed at one time. Instead of producing the legend on the original negative containing the pictures it may be produced upon the positive either by photography, or ordinary printing or otherwise.

Various methods of producing the legend are described in my application No. 828,595, for motion picture film, filed March 31, 1914, of which the present application is a division, and it is therefore unnecessary to describe to any extent the various modes of producing the legend.

In the arrangement of Fig. 3 the legend is produced by successively displaced parts of the complete legend properly timed in lateral displacement with the speed of movement of the film, so that the legend will apparently move across the screen at a speed permitting ready reading of the legend without confusion. A much greater amount of descriptive matter is thus displayed than is possible where the continuity of the picture is interrupted for descriptive matter, and this running description of or commentary on the pictures is impossible with the present invention without any interruption in the continuity of the pictures and with the saving of a relatively large proportion of film.

In either of the arrangements shown the legend may, of course, be produced directly upon the picture itself, but while such procedure is useful it does not give as satisfactory results as when the legend is produced upon a space individual to it.

What is claimed is:—

1. A motion picture film having successive spaced portions provided with successive pictures, and with the spaces between the pictures occupied by descriptive matter located on the film to progress at reading speed across the screen upon which the pictures are projected in a direction contrary to the order of reading of such descriptive matter.

2. A motion picture film having successive pictures thereon in spaced relation one to the other in the direction of the length of the film with the intervening spaces provided with descriptive matter progressively displaced crosswise of the film with respect to the direction of travel of the film to cause such reading matter when produced upon a screen to have an apparent slow movement in opposition to the normal movement of the human eye in reading.

3. A motion picture film having successive pictures thereon and descriptive matter accompanying the pictures and including changing wording having an apparent movement crosswise of the film in intelligibly connected sequence forming a running description or commentary on the pictures displayed with the words changing in sequence at such speed as to be readily read.

In testimony that I claim the foregoing as my own, I have hereto affixed my signature in the presence of two witnesses.

LEE MILLER.

Witnesses:
J. B. WRIGHT,
H. J. CARTON.